(No Model.) 2 Sheets—Sheet 1.

J. H. STEVENS & J. L. JOLLY.
WINDMILL.

No. 537,494. Patented Apr. 16, 1895.

Witnesses
Jas. K. McCathran
H. P. Riley

Inventors
John H. Stevens
John L. Jolly
By their Attorneys, C. A. Snow & Co.

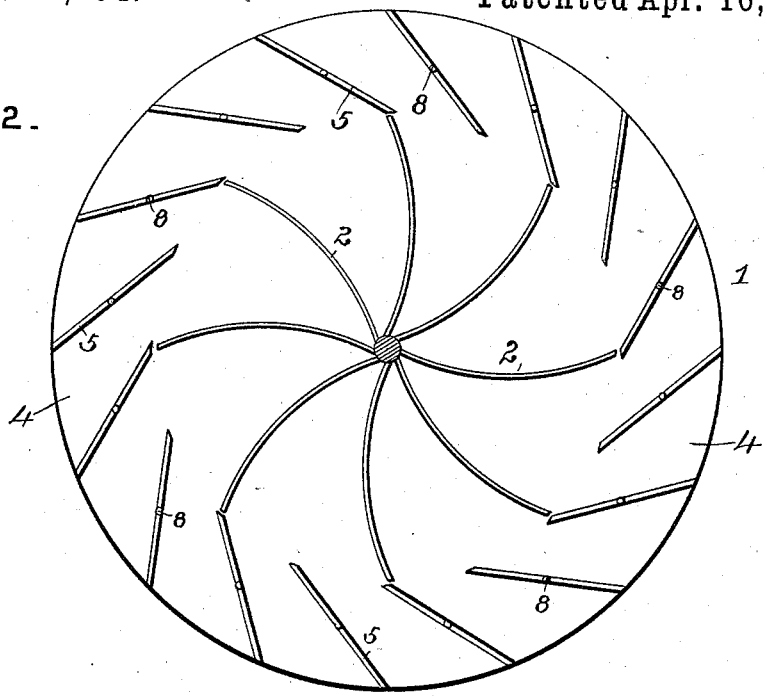
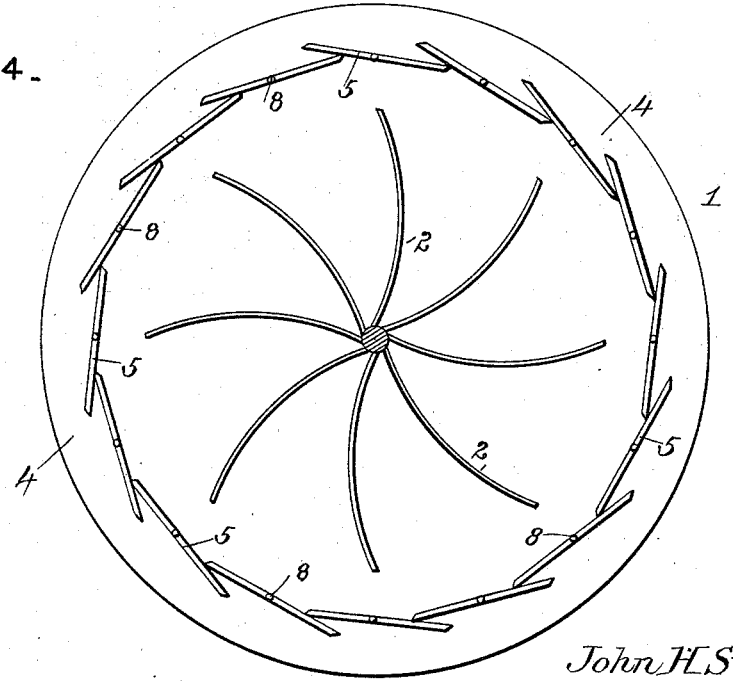

UNITED STATES PATENT OFFICE.

JOHN H. STEVENS AND JOHN L. JOLLY, OF MARSHFIELD, MISSOURI.

WINDMILL.

SPECIFICATION forming part of Letters Patent No. 537,494, dated April 16, 1895.

Application filed June 22, 1894. Serial No. 515,415. (No model.)

*To all whom it may concern:*

Be it known that we, JOHN H. STEVENS and JOHN L. JOLLY, citizens of the United States, residing at Marshfield, in the county of Webster and State of Missouri, have invented a new and useful Windmill, of which the following is a specification.

The invention relates to improvements in wind mills.

The object of the present invention is to improve the construction of that class of wind mills having horizontal wind wheels, and to provide simple, inexpensive, and effective means for controlling the admission of wind to the wind wheel, and of directing the same to the wind wheel in the most advantageous manner.

A further object of the invention is to enable wind to be entirely excluded from the wind wheel to avoid injury to the latter through high winds, and to stop the wind mill.

The invention consists in the construction and novel combination and arrangement of parts hereinafter fully described, illustrated in the accompanying drawings, and pointed out in the claim hereto appended.

Figure 1:
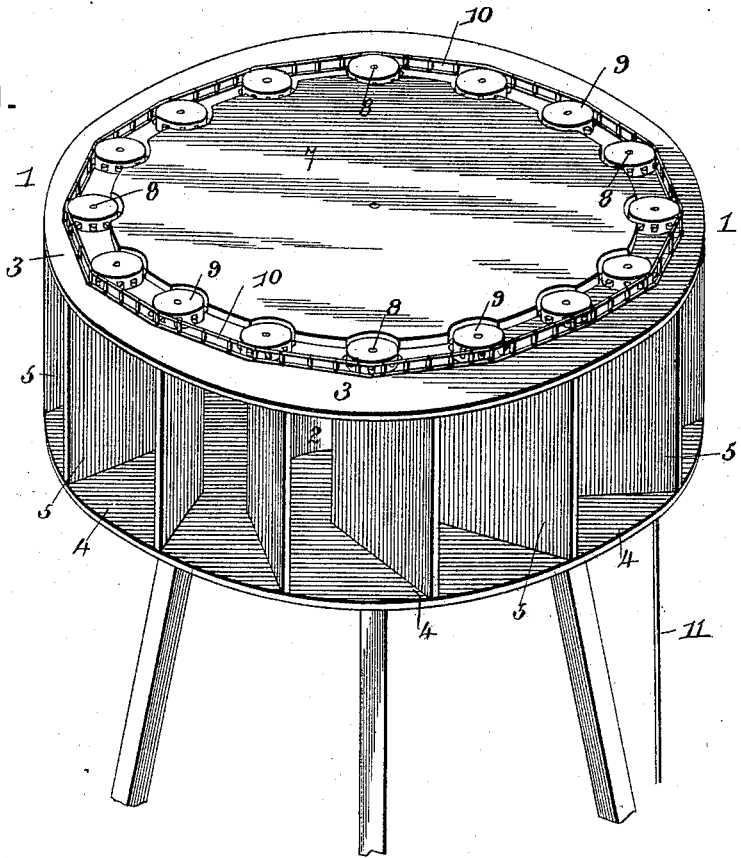
Figure 3:
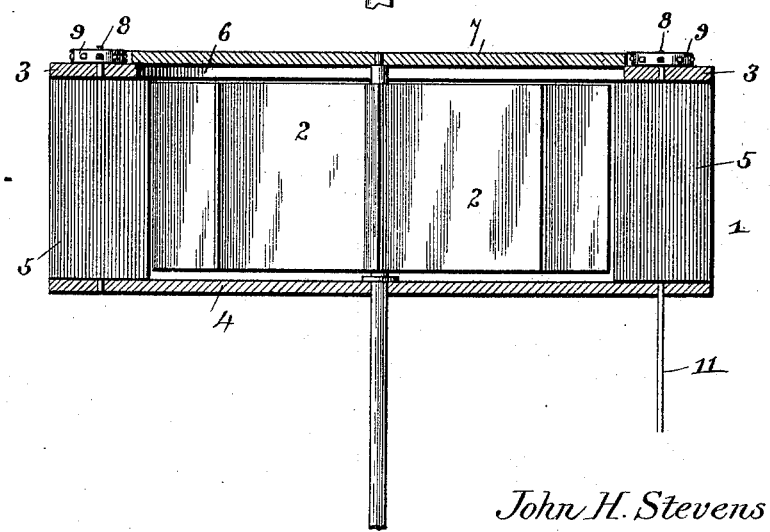

In the drawings—Figure 1 is a perspective view of a portion of a wind mill constructed in accordance with this invention, the adjustable partitions or shutters being open. Fig. 2 is a horizontal sectional view of the same. Fig. 3 is a vertical sectional view of the wind mill. Fig. 4 is a horizontal sectional view, the shutters or partitions being closed.

Like numerals of reference indicate corresponding parts in all the figures of the drawings.

1 designates a circular casing, designed to be mounted on a wind mill tower, and adapted to contain a horizontal wind wheel 2. The casing consists of upper and lower disks 3 and 4, and a series of adjustable partitions or shutters 5 arranged at the peripheries of the disks, and journaled between the same, and adapted to be arranged at any desired angle for admitting air to the wind wheel in the most advantageous manner, and to shield the wind wheel from adverse actions of the wind tending to retard the wind wheel. The annular series of adjustable shutters or partitions 5 obviate the necessity of employing feathering blades. The upper disk is provided with a central opening 6, to enable the wind wheel to be introduced into the casing, and a circular cap plate 7 is secured upon the upper face of the upper disk, and is provided with a central bearing for the vertical shaft carrying the wind wheel.

The upper journals 8 of the shutters or partitions extend through the upper disk, and carry sprocket wheels 9 connected by a sprocket chain 10, whereby the shutters or partitions are simultaneously operated, and a vertical shaft or pintle rod 11 which forms the journals for one of the partitions or shutters, and which depends from the casing enables the shutters or partitions to be operated from below, and is designed to be provided with a lever or handle or the like, to facilitate its operation. The cap plate is provided adjacent to the sprocket pinions with recesses to permit the pinions to turn clear of it.

The upper faces of the sprocket wheels are arranged in the same plane as the upper face of the cap plate, and the inner edges of the shutters when open are arranged contiguous to the outer edges of the blades of the wind wheel.

The adjustable partitions or shutters may be of any desired number and size to correspond with the diameter of the wind-wheel, and it will be readily apparent that the shutters or partitions may be readily adjusted to direct the wind upon the wheel in the most advantageous manner, to regulate the force of the wind, and to exclude the same entirely.

Changes in the form, proportion and the minor details of construction may be resorted to without departing from the principle or sacrificing any of the advantages of this invention.

What we claim is—

In a windmill, the combination of a casing, comprising the upper and lower disks 3 and 4, the upper disk 3 being provided with a central opening, and the cap plate 7 secured to the upper face of the upper disk and provided with peripheral recesses, a horizontal wind wheel arranged within the casing and being of a diameter to pass through the opening of the top disk, the annular series of shutters pivotally mounted between the upper and lower disks and having upper pivots or journals extended through the upper disk, said shutters being adapted to be turned on their pivots or journals to close the periphery of the casing to shut off the wind from the wind wheel and to direct the wind to the wheel, the inner edges of the shutters, when open, being arranged contiguous to the outer edges of the blades of the wind-wheel, an annular series of sprocket wheels arranged on the upper face of the top disk and rigidly secured to the upper pivots or journals, and having their upper faces flush with the upper face of the cap plate, said pinions being arranged adjacent to said recesses, an operating shaft depending from the casing and forming a pivot for one of the shutters, and an endless chain arranged on the sprocket wheels and causing the shutters to be simultaneously operated when the said shaft is rotated, substantially as described.

In testimony that we claim the foregoing as our own we have hereto affixed our signatures in the presence of two witnesses.

JOHN H. STEVENS.
JOHN L. JOLLY.

Witnesses:
F. L. HAYMES,
ORIN BRANNOCK.